United States Patent
Huang (10) Patent No.: US 7,103,198 B2
(45) Date of Patent: Sep. 5, 2006

(54) METHOD FOR DETERMINING AN ADJACENCY RELATION

(75) Inventor: Tun-chi Huang, Taipei (TW)

(73) Assignee: NewSoft Technology Corporation, (TW)

( * ) Notice: Subject to any disclaimer, the term of this patent is extended or adjusted under 35 U.S.C. 154(b) by 832 days.

(21) Appl. No.: 10/313,382

(22) Filed: Dec. 6, 2002

(65) Prior Publication Data

US 2003/0206655 A1 Nov. 6, 2003

(30) Foreign Application Priority Data

May 6, 2002 (TW) .............................. 91109507 A (51) Int. Cl.
*G06K 9/00* (2006.01)
(52) U.S. Cl. .................. 382/100; 382/268; 380/37; 360/48; 360/53; 705/75
(58) Field of Classification Search ................ 382/100, 382/151, 173, 263, 268; 380/37; 360/48, 360/53; 705/75; 714/48, 747, 755, 805; 902/2, 22
See application file for complete search history.

(56) References Cited

U.S. PATENT DOCUMENTS

| | | | | |
|---|---|---|---|---|
| 4,553,206 A | * | 11/1985 | Smutek et al. .............. | 707/101 |
| 4,829,470 A | * | 5/1989 | Wang .......................... | 715/521 |
| 5,548,106 A | * | 8/1996 | Liang et al. ................. | 235/454 |
| 5,822,454 A | * | 10/1998 | Rangarajan .................. | 382/180 |
| 6,650,761 B1 | * | 11/2003 | Rodriguez et al. ........... | 382/100 |
| 6,665,454 B1 | * | 12/2003 | Silverbrook et al. ........ | 382/299 |
| 6,786,420 B1 | * | 9/2004 | Silverbrook ................ | 235/494 |
| 6,947,571 B1 | * | 9/2005 | Rhoads et al. .............. | 382/100 |

* cited by examiner

Primary Examiner—Sheela Chawan (74) Attorney, Agent, or Firm—Martine Penilla & Gencarella, LLP (57) ABSTRACT

A method for determining an adjacency relation for analyzing a business card containing data blocks. A target data block and a comparison data block is selected from the data blocks. Then, the method checks whether the comparison data block is topologically overlapped with the target data block. If they are topologically overlapped, then it checks whether the comparison data block has the shortest distance to the target data block, in comparison with data blocks that are topologically overlapped with the target data block. If the distance is shortest, then it checks whether there exists an interrupted data block between the comparison data block and the target data block. If there exists no interrupted data block, it is determined that there exists an adjacency relation between the comparison data block and the target data block. A computer readable recording medium is also disclosed, which executes the method as mentioned above.

12 Claims, 6 Drawing Sheets

| Data block | Above | Below | Left | Right |
|---|---|---|---|---|
| 101 |  | 102 |  | 103 |
| 102 | 101 | 106 |  | 105 |
| 103 |  | 104 | 101 |  |
| 104 | 103 | 105 | 102 |  |
| 105 | 104 | 112 | 102 |  |
| 106 | 102 | 107 |  | 111 |
| 107 | 106 | 108 |  | 112 |
| 108 | 107 | 109 |  | 113 |
| 109 | 108 | 110 |  |  |
| 110 | 109 |  |  |  |
| 111 |  | 112 | 106 |  |
| 112 | 111 | 113 | 107 |  |
| 113 | 112 |  | 108 |  |

FIG. 5

METHOD FOR DETERMINING AN ADJACENCY RELATION

BACKGROUND OF THE INVENTION

1. Field of the Invention

The invention relates to a method for determining an adjacency relation and, more particularly, to a method for determining an adjacency relation between a target data block and a comparison data block selected from data blocks of a business card.

2. Description of the Related Art

Up to the present time, the use of business cards is prevailed in the industrial and commercial world. Exchanging business cards has become a social etiquette and a way to introduce oneself. However, with the increasing number of business cards collected, it has become more and more difficult to manage them. Too many business cards make it hard to search and inconvenient to carry which become a torment to a user.

However, with the progress in technology, the above-mentioned problem can be resolved. That is, to digitize the information on the business cards and save it to a personal computer. Thus, not only does it become more convenient and fast to search and manage, after converting and storing information of a large number of business cards into a handheld electronic device, it is even more convenient to carry around without the restriction of carrying a heavy business card album. Furthermore, one can even transmit and exchange the digitized business card information, to achieve the object of fast information flow.

In order to digitize the information on a business card, firstly it is needed to identify data blocks on the business card, determine the adjacency relation between each data block, followed by subsequent processes such as the method of comparing keywords, special formats or conditions. In a conventional method, the distance between data blocks is checked, then a fixed value derived from experience is used to determine whether the distance is "close enough" to have an adjacency relation and need to be combined in subsequent processes. A drawback of this is that the determination for so called "close enough" is based on an experience value. The experience value is obtained from prior training. If the prior training is not sufficient, the judgement will not be accurate. Even if there is sufficient training, some unforeseeable problems may still happen because there is no set rules for the design and layout of a business card.

Figure 1A:
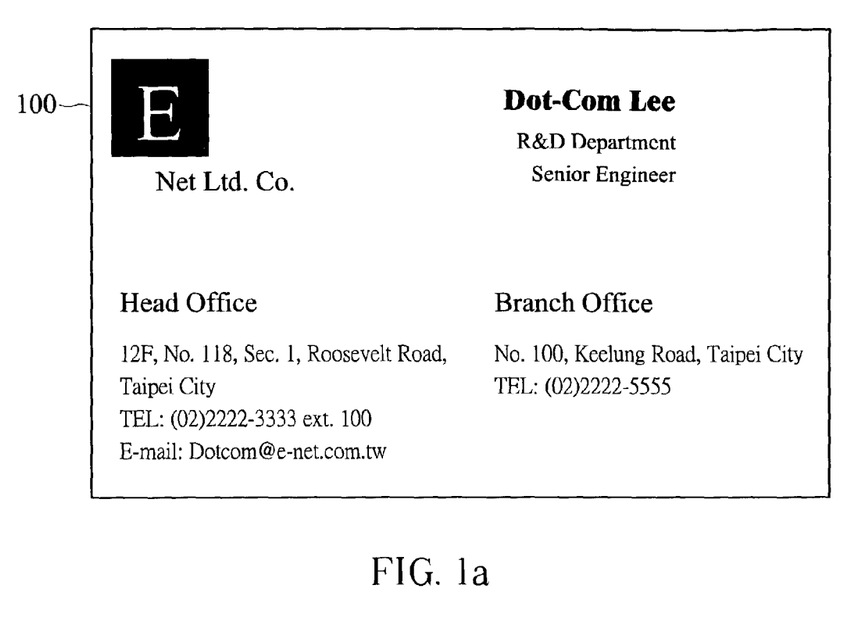
FIG. 1a is a schematic diagram showing a business card.
Figure 1B:
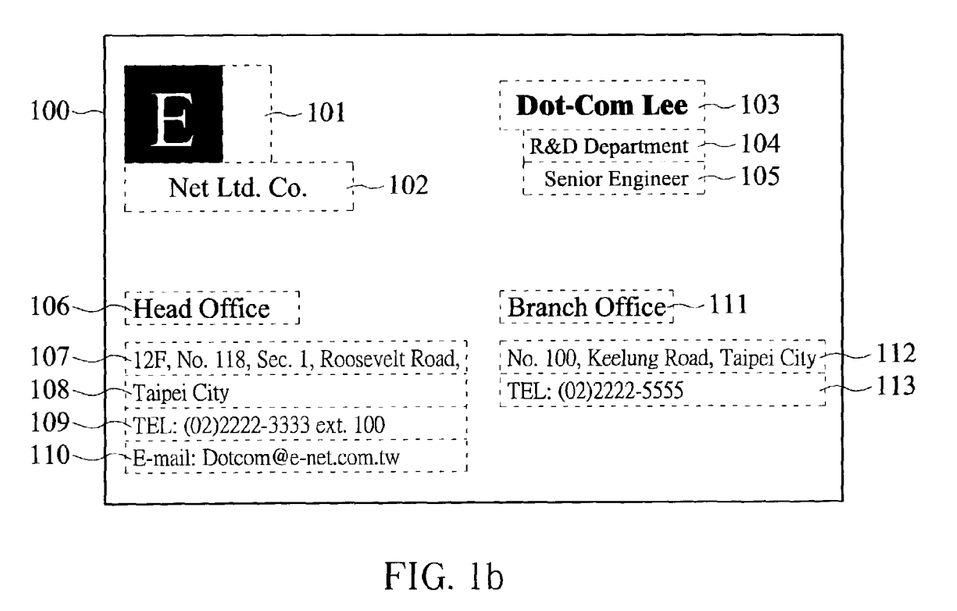
FIG. 1b is a schematic diagram showing the business card and data blocks thereon.

FIGS. 1a and 1b shows a business card 100 for "E Net Ltd. Co." as an example. The business card 100 includes thirteen data blocks 101 to 113, which includes the company name, employee name, department, title, company address, company phone number and extension, and e-mail address. A result that data blocks 101 and 102 are close enough and should be combined can be obtained by the conventional method. However, the conventional method does not determine the relative relations of the vertical and horizontal positions of the data blocks. Therefore, the combined result may become in reversed order, that is, "Net Ltd. Co. E".

Further, using data blocks 107 and 112 as an example, data blocks 107 and 112 may be determined to be close enough by the conventional method. Therefore, the two blocks 107 and 112 may be combined to get a wrong address of "12F, No. 118, Sec. 1, Roosevelt Road, No. 100, Keelung Road, Taipei City."

Therefore, it is needed urgently to provide a method which can accurately determine the adjacency relation in order to assist the succeeding process of business card information.

SUMMERY OF THE INVENTION

In view of the above problems, an object of the invention is to provide a method for determining an adjacency relation, which can analyze all relative relations between data blocks on a business card, in order to increase the accuracy for determining the adjacency relations.

In order to achieve the object, according to the invention, the method for determining an adjacency relation is used to analyze a business card that has a plurality of data blocks. The first step is to select a target data block and a comparison data block from the data blocks. Then, to check if the comparison data block and the target data block are topologically overlapped. "Topologically overlapped" means that an intersection of vertical or horizontal projections of the comparison data block and the target data block in proportion to each projection reaches a certain value. If both the comparison data block and the target data block are topologically overlapped, the next step is to check if the comparison data block is the nearest one in distance to the target data block, comparing to other data blocks which are also topologically overlapped with the target data block. If the distance between the comparison data block and the target data block is the shortest one, then check whether there exists an interrupted data block between the comparison data block and the target data block. The interrupted data block is one of the data blocks which is not topologically overlapped with the comparison data block nor the target data block on neither vertical nor horizontal direction, and the vertical or horizontal projection of the data block is situated between the vertical or horizontal projections of the comparison data block and the target data block. Finally, if there exists no interrupted data block between the comparison data block and the target data block, it is then determined that there exists an adjacency relation between the comparison data block and the target data block.

Moreover, the invention also provides a computer readable recording medium which records an analyzing program. According to the steps mentioned above, the program analyzes the business card having a plurality of data blocks.

According the invention, the method for determining an adjacency relation checks, in sequence, if any two data blocks on the business card are topologically overlapped, whether the distance between the two is the shortest, are they interrupted by other data blocks. Then, the method records the relative position of data blocks that are adjacent to each other. Through the analysis of the relative relation between data blocks, it can take the place of the conventional determination method which uses only the distance, and may increase the accuracy for determining adjacency relations.

DETAILED DESCRIPTION OF PREFERRED EMBODIMENTS

The method for determining an adjacency relation will be described with a preferred embodiment of the invention with reference to the accompanying drawings. In the accompanying drawings, like components will be illustrated with like reference numerals.

Figure 2A:
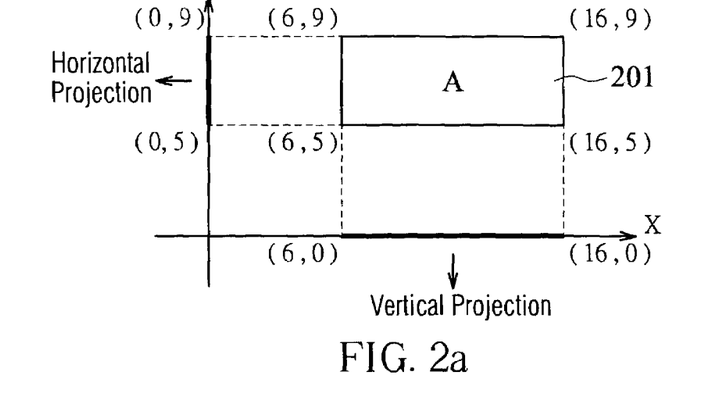
FIG. 2a is a schematic diagram illustrating "Projection".

First, the terminology used in the embodiments are defined as following:

Projection: the shadow projected by a data block (with a rectangle shape) on to the x- or y-axis of a plane. The projection on the x-axis is a vertical projection, and the projection on the y-axis is a horizontal projection. Referring to FIG. 2a, a data block A (201) has coordinates of (6, 5), (16, 5), (6, 9) and (16, 9). The vertical projection is a line segment on the x-axis formed between (6, 0) and (16, 0). The horizontal projection is a line segment on the y-axis formed between (0, 5) and (0, 9).

Figure 2B:
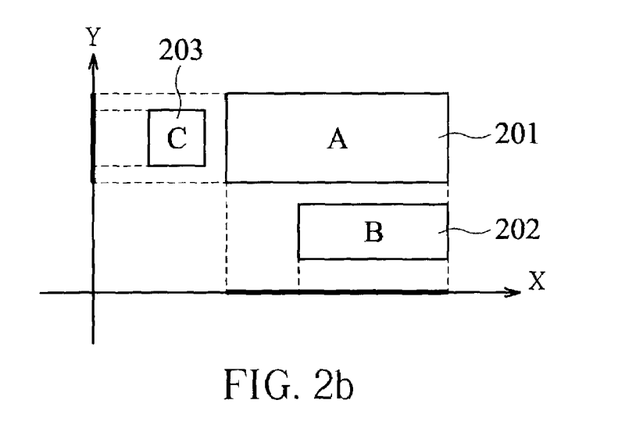
FIG. 2b is a schematic diagram illustrating "Aligned" and "Contained" relations.

Aligned: if the vertical/horizontal projection of a data block has a same starting or finishing point as the vertical/horizontal projection of another data block, the two data blocks are vertically/horizontally aligned. Referring to FIG. 2b, the data block A (201) and the data block B (202) are vertically aligned.

Contain: if the vertical/horizontal projection of a data block is a subclass of the vertical/horizontal projection of another data block, then the data block is vertically/horizontally contained in the other data block. As shown in FIG. 2b, the data block A (201) contains the data block B (202) vertically, and it also contains a data block C (203) horizontally.

Figure 2C:
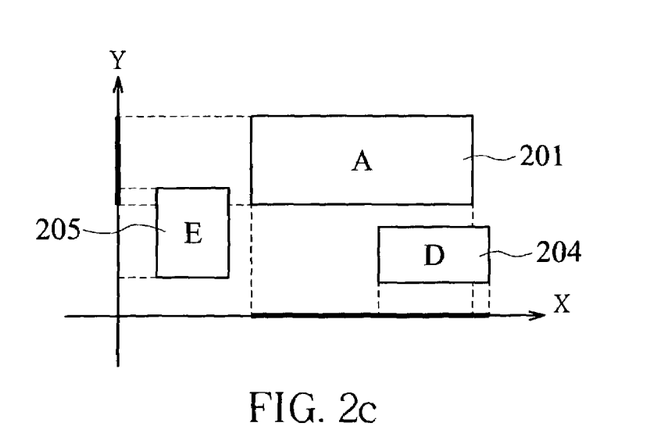
FIG. 2c is a schematic diagram illustrating "Overlapped" relations.

Overlapped: if the vertical/horizontal projections of two data blocks contain an intersection, the two data blocks are vertically/horizontally overlapped. As shown in FIG. 2c, the data block A (201) is vertically overlapped with a data block D (204), and is horizontally overlapped with data a block E (205).

Figure 2D:
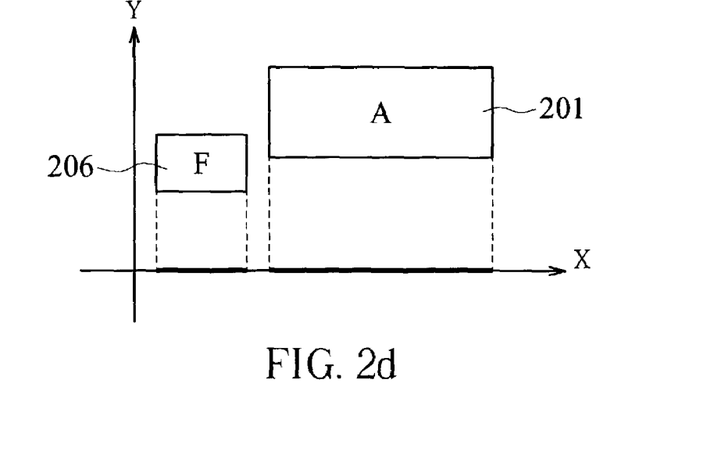
FIG. 2d is a schematic diagram illustrating "Not Overlapped" relations.

Not overlapped: if two data blocks contain no intersection for their vertical/horizontal projections, the two data blocks are vertically/horizontally not overlapped. As shown in FIG. 2d, the data block A (201) and the data block F (206) are vertically not overlapped.

Partially overlapped: if a certain value of the intersection of the vertical/horizontal projections of two data blocks to the vertical/horizontal projections for both data blocks is smaller than a certain value, for example, three quarters (¾), the two data blocks are vertically/horizontally partially overlapped. Referring to FIG. 2c, the data block A (201) and the data block E (205) are horizontally partially overlapped.

Topologically overlapped: if two data blocks are vertically/horizontally overlapped, and they are not vertically/horizontally partially overlapped, the two data blocks are vertically/horizontally topologically overlapped.

Figure 2E:
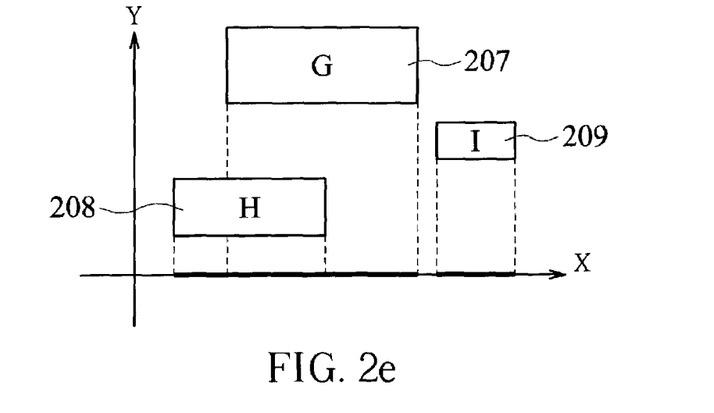
FIGS. 2e and 2f are schematic diagrams illustrating "Interrupted" relations.
Figure 2F:
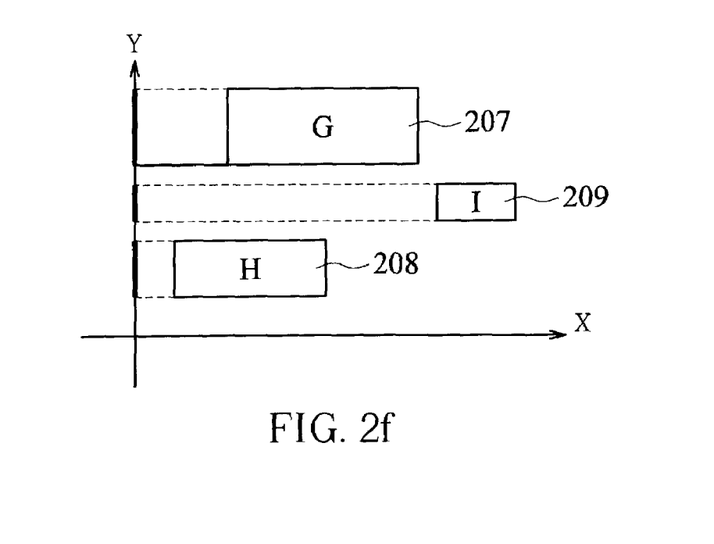

Interrupt: if a data block is not overlapped with any of the other two data blocks on either the vertical nor horizontal direction, and the vertical or horizontal projection of the data block is situated between the vertical or horizontal projections of the other two data blocks, the data block vertically/horizontally interrupts these data blocks. As shown in FIGS. 2e and 2f, a data block I (209) is not overlapped with any of the vertical/horizontal projections of a data block G (207) and a data block H (208), and the horizontal projection of the data block I (209) is situated between the horizontal projections of the data block G (207) and data block H (208), therefore, the data block I (209) interrupts the data block G (207) and the data block H (208).

Figure 3:
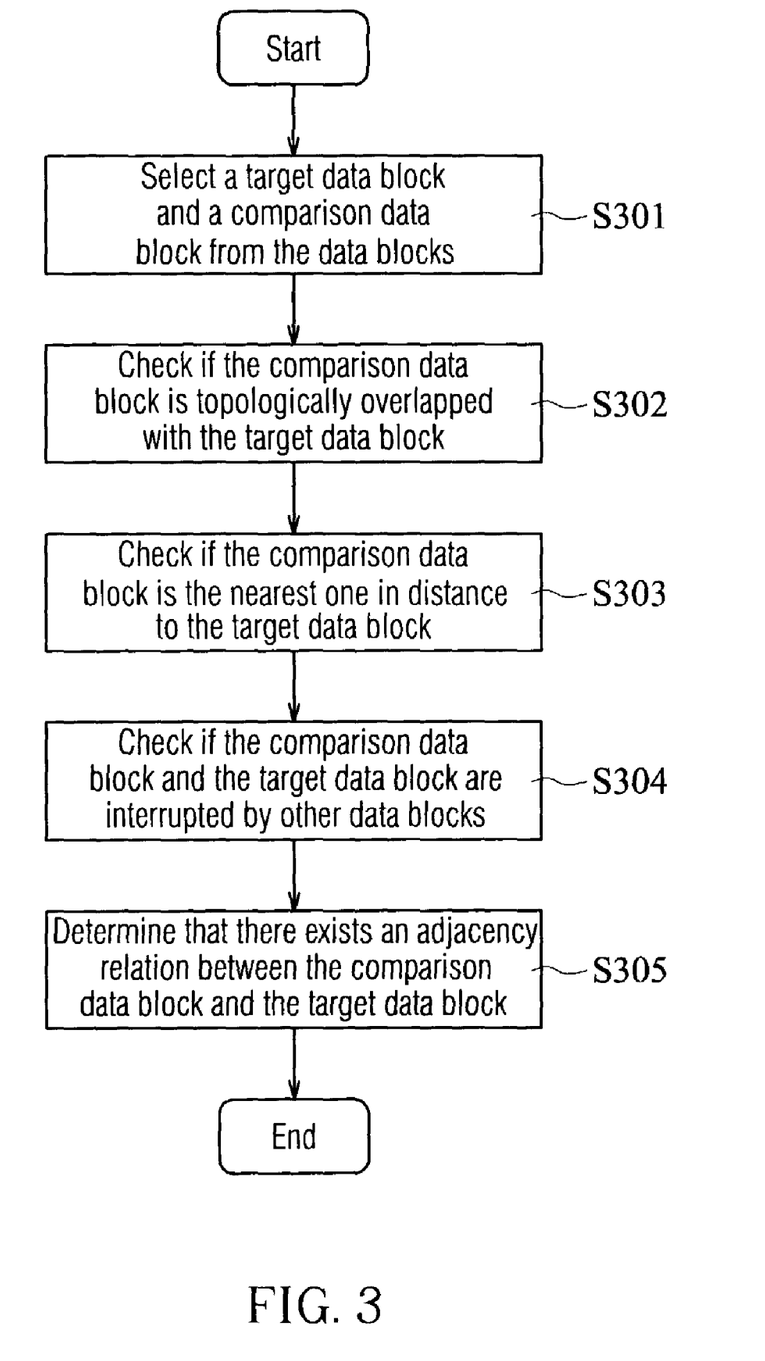
FIG. 3 is a flow chart illustrating the steps of the method for determining an adjacency relation in accordance with one embodiment of the invention.

Referring to FIG. 3, according to the embodiment of the invention, the method for determining an adjacency relation is used to analyze a business card that includes a plurality of data blocks. The first step is to select a target data block and a comparison data block from the data blocks (S301). The method then checks if the comparison data block is topologically overlapped with the target data block (S302). If the comparison data block is topologically overlapped with the target data block, the next step is to check if the comparison data block is the nearest one in distance to the target data block in comparison with other data blocks which are also topologically overlapped with the target data block (S303). If the distance between the comparison data block and the target data block is the shortest one, then the method checks if the comparison data block and the target data block are interrupted by any other data blocks (S304). If there exists no interrupted data block between the comparison data block and the target data block, then it is determined that there exists the adjacency relation between the comparison data block and the target data block (S305).

Figure 4:
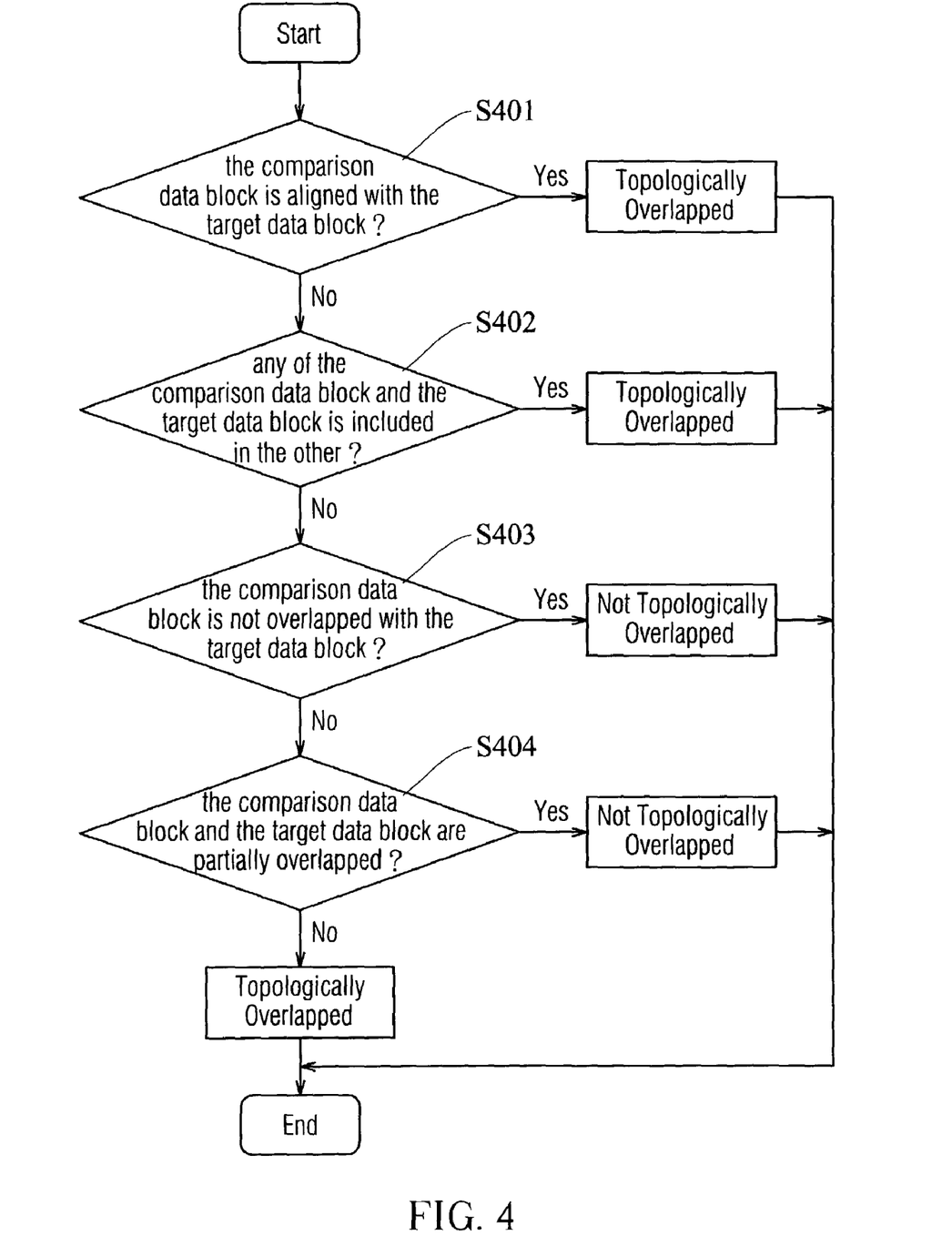
FIG. 4 is a flow chart illustrating the steps of the method for determining the relation of topologically overlapped.

As shown in FIG. 4, the step of checking if the comparison data block and the target data block are topologically overlapped (S302) can further be subdivided into the following steps. First, check if the comparison data block is aligned with the target data block (S401). If it is, the comparison data block and the target data block are topologically overlapped. If it is not, then check if any of the comparison data block and the target data block is included in the other data block (S402). If it is, the two data blocks are topologically overlapped. If it is not, further check if the comparison data block and the target data block are not overlapped (S403). If so, the data blocks are not topologically overlapped, otherwise, further check if the comparison data block and the target data block are partially overlapped (S404). If the data blocks are partially overlapped, they are not topologically overlapped; otherwise, they are topologically overlapped.

It should be noted that the above-mentioned steps (S301)–(S305) as shown in FIG. 3 and the steps (S401)–(S404) as shown in FIG. 4 can be applied to both the vertical direction and the horizontal direction.

For better understanding of the invention, the business card 100 as shown in FIG. 1b will be used as an example to describe the method for determining an adjacency relation in accordance with one embodiment of the invention.

Take the data block 101 as an example. First, according to the steps as shown in FIG. 4 (that is, to check if data blocks are aligned, contained, not overlapped, and partially overlapped), we can get data blocks that are vertically topologically overlapped with the data block 101 are data blocks 102, 106, 107, 108, 109 and 110. Among these data blocks, the data block that is closest to the data block 101 is the data block 102. Besides, there is no interrupted data block between the data block 101 and the data block 102. Thus, there exists a vertically adjacency relation between the data block 101 and data block 102. At the same time, from the location of the horizontal projection, we can know that data block 101 is located above the data block 102. In succeeding processes, since the data blocks 101 and 102 are vertically adjacent to each other, therefore, it is required to further determine if the two data blocks need to be combined. If data blocks need to be combined, since the data block 101 "E" is located above the data block 102 "Net Ltd. Co.," the combined result is "E Net Ltd. Co." Furthermore, based on the same principle, we know that data blocks 101 and 103 are horizontally adjacent to each other. Whether to combine the two data blocks is determined in the succeeding processes.

Take the data block 107 as another example, according to the steps illustrated in FIG. 4, we know that data blocks that are vertically topologically overlapped with the data block 107 are data blocks 101, 102, 106, 108, 109 and 110. Among these data blocks, the data block that is the closest one to the data block 107 is the data block 108. Besides, there is no interrupted data block between the data block 107 and the data block 108. Thus, there exists a vertically adjacency relation between the data block 107 and the data block 108. At the same time, from the location of the horizontal projection, we know that the data block 107 is located above the data block 108. In succeeding processes, since the data block 107 and the data block 108 are vertically adjacent to each other, we need to further determine if the two data blocks need to be combined. If the two blocks need to be combined, since the data block 107 "12F, No. 118, Sec. 1, Roosevelt Road," is located above the data block 108 "Taipei City". Therefore, the combined result is "12F, No. 118, Sec. 1, Roosevelt Rod, Taipei City". Furthermore, based on the same principle, we know that the data block 107 and the data block 112 are horizontally adjacent to each other. However, since the method determines that the address data in the horizontal direction need not to be combined, the data block 107 and data block 112 will not be combined.

Figure 5:
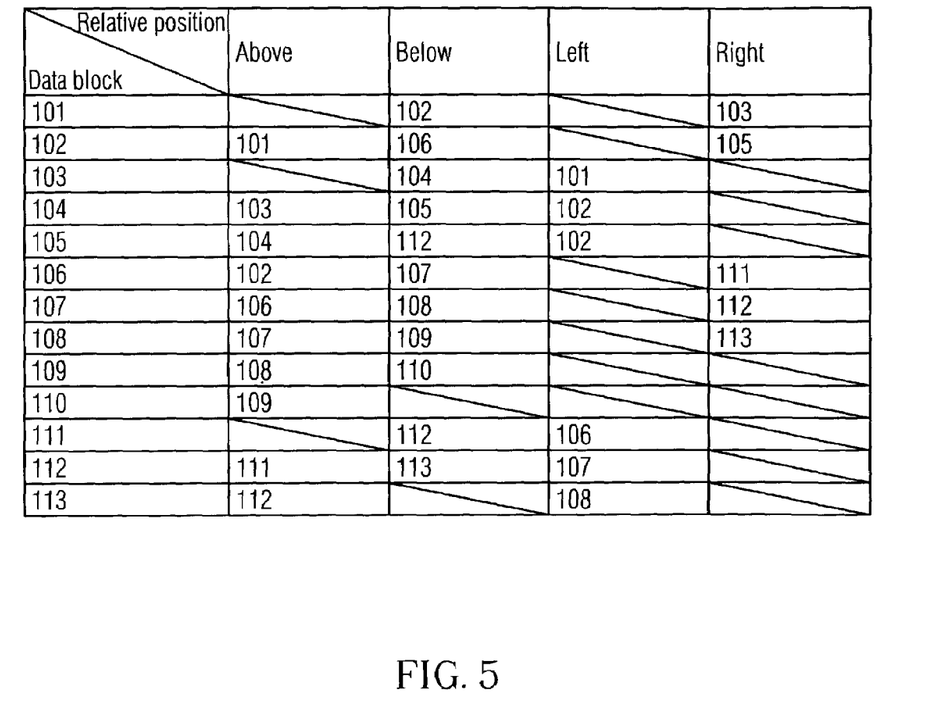
FIG. 5 is a table showing the relative relations between data blocks.

The steps illustrated in FIGS. 3 and 4 are carried out for every data block of the business card 100, the vertical and horizontal adjacency relations between each data block can be obtained as shown in FIG. 5.

In addition, the invention further includes a computer readable recording medium which records an analyzing program. According to the steps illustrated in FIGS. 3 and 4, the analyzing program analyzes the adjacency relations between a plurality of data blocks on a business card.

To sum up, the method for determining an adjacency relation in accordance with the invention checks, in sequence, if data blocks contained in the business card are topologically overlapped, if the distance is the shortest, if interrupted by other data blocks. Then, the method records the relative position of data blocks that are adjacent to each other. Through the analysis of the relative relation between data blocks, it can take over the place of the conventional determination method which uses only the distance, and may increase the accuracy for determining adjacency relations.

While the invention has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the invention.

What is claimed is:

1. A method for determining an adjacency relation used in analyzing a business card having a plurality of data blocks, the method comprising the steps of:
   (A) selecting a target data block and a comparison data block from the data blocks;
   (B) checking if the comparison data block and the target data block are topologically overlapped, wherein "topologically overlapped" means that an intersection of vertical or horizontal projections of the comparison data block and the target data block in proportion to each projection reaches a certain value;
   (C) if the comparison data block and the target data block are topologically overlapped, then checking the comparison data block, in comparison with the data blocks which are topologically overlapped with the target data block, whether it is the nearest one in distance to the target data block;
   (D) if the comparison data block is the nearest one in distance to the target data block, then checking whether there exists an interrupted data block between the comparison data block and the target data block, the interrupted data block is one of the data blocks which is not topologically overlapped with the comparison data block nor the target data block on neither vertical nor horizontal directions and a vertical or horizontal projection of the interrupted data block is situated between the vertical or horizontal projections of the comparison data block and the target data block; and
   (E) if there exists no interrupted data block between the comparison data block and the target data block, then determining there exists an adjacency relation between the comparison data block and the target data block.

2. The method of claim 1, wherein the step (B) comprises the step of:
   determining whether the projections of the comparison data block and the target data block have a same starting point or finishing point.

3. The method of claim 1, wherein the step (B) comprises the step of:
   determining if a projection of one of the comparison data block and the target data block is a subclass of the other projection.

4. The method of claim 1, wherein the step (B) comprises the step of:
   determining whether there is no intersection between the projections of the comparison data block and the projection of the target data block.

5. The method of claim 1, wherein the step (B) comprises the step of:
   determining whether the intersection of the projections of the comparison data block and the target data block reaches the certain value in proportion to each projection.

6. The method of claim 1, wherein the certain value is determined by a user.

7. A computer readable recording medium, which records a program for analyzing adjacency relations between a plurality of data blocks on a business card according to the following steps:
   (A) selecting a target data block and a comparison data block from the data blocks;
   (B) checking if the comparison data block and the target data block are topologically overlapped, wherein "topologically overlapped" means that an intersection of vertical or horizontal projections of the comparison data block and the target data block in proportion to each projection reaches a certain value;

(C) if the comparison data block and the target data block are topologically overlapped, then checking the comparison data block, in comparison with the data blocks which are topologically overlapped with the target data block, whether it is the nearest one in distance to the target data block;

(D) if the comparison data block is the nearest one in distance to the target data block, then checking whether there exists an interrupted data block between the comparison data block and the target data block, the interrupted data block is one of the data blocks which is not topologically overlapped with the comparison data block nor the target data block on neither vertical nor horizontal directions and a vertical or horizontal projection of the interrupted data block is situated between the vertical or horizontal projections of the comparison data block and the target data block; and (E) if there exists no interrupted data block between the comparison data block and the target data block, then determining there exists an adjacency relation between the comparison data block and the target data block.

8. The computer readable recording medium of claim 7, wherein the step (B) comprises the step of:

determining whether the projections of the comparison data block and the target data block have a same starting point or finishing point.

9. The computer readable recording medium of claim 7, wherein the step (B) comprises the step of:

determining if a projection of one of the comparison data block and the target data block is a subclass of the other projection.

10. The computer readable recording medium of claim 7, wherein the step (B) comprises the step of:

determining whether there is no intersection between the projections of the comparison data block and the projection of the target data block.

11. The computer readable recording medium of claim 7, wherein the step (B) comprises the step of:

determining whether the intersection of the projections of the comparison data block and the target data block reaches the certain value in proportion to each projection.

12. The computer readable recording medium of claim 7, wherein the certain value is determined by a user.

* * * * *